US011187525B2

(12) United States Patent
Kline et al.

(10) Patent No.: US 11,187,525 B2
(45) Date of Patent: Nov. 30, 2021

(54) LASER GRID INSPECTION OF THREE-DIMENSIONAL OBJECTS

(71) Applicant: International Business Machines Corporation, Armonk, NY (US)

(72) Inventors: Eric V. Kline, Pine Island, MN (US); Wen Qi Loh, Singapore (SG); Jon Vitas Elumbaring Guiritan, Camden Park (AU); Lee Leng Tey, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/734,698

(22) Filed: Jan. 6, 2020

(65) Prior Publication Data

US 2021/0207955 A1     Jul. 8, 2021

(51) Int. Cl.
*G01B 11/25*     (2006.01)
*G01N 21/89*     (2006.01)
*G06K 9/20*      (2006.01)

(52) U.S. Cl.
CPC ..... *G01B 11/2518* (2013.01); *G01N 21/8901* (2013.01); *G06K 9/20* (2013.01); *G06K 2209/40* (2013.01)

(58) Field of Classification Search
CPC ..... G01B 11/2518; G01B 11/24; G01B 11/25; G01B 11/2504; G01B 11/2527; G01N 21/8901; G01N 21/89; G06K 9/20; G06K 2209/40; B21C 51/00
USPC ............................ 356/601–624, 237.2–237.6
See application file for complete search history.

(56) References Cited

U.S. PATENT DOCUMENTS

| | | | | |
|---|---|---|---|---|
| 2005/0046873 | A1* | 3/2005 | Suzuki | G01B 11/2527 356/605 |
| 2006/0103854 | A1* | 5/2006 | Franke | G01B 11/2504 356/603 |
| 2008/0013103 | A1* | 1/2008 | Inoue | G06F 3/04845 356/610 |
| 2011/0043825 | A1* | 2/2011 | Isozaki | G01B 11/245 356/612 |
| 2012/0236317 | A1* | 9/2012 | Nomura | G01B 11/25 356/610 |
| 2015/0022634 | A1 | 1/2015 | Perez | |
| 2015/0268035 | A1* | 9/2015 | Furihata | G01B 11/254 348/136 |

OTHER PUBLICATIONS

Weyrich et al., "Vision based Defect Detection on 3D Objects and Path Planning for Processing", Recent Researches in Multimedia Systems, Signal Processing, Robotics, Control and Manufacturing Technology, 2011, ISBN: 978-960-474-283-7, 6 pages.

(Continued)

*Primary Examiner* — Isiaka O Akanbi
(74) *Attorney, Agent, or Firm* — Timothy J. Singleton

(57) ABSTRACT

A method, system, and computer program product for optical inspection of objects. The method projects an optical test line on a device under test. A frame is captured of the optical test line projected onto the device under test. The method provides a reference line for the device under test and compares the reference line and the optical test line within the frame. The method generates a visual quality determination based on the comparison of the reference line and the optical test line.

20 Claims, 9 Drawing Sheets

(56) References Cited

OTHER PUBLICATIONS

Huang et al., "A Laser-Based Vision System for Weld Quality Inspection", Sensors 2011, 11, 506-521; doi:10.3390/s110100506, 16 pages, Published: Jan. 6, 2011.

"Virtek 3D Laser Inspection Machine the LaserQC AFM", Modern Machinery Company, Laser Inspection Machine, printed Sep. 17, 2019, 3 pages. http://www.modernmachinerycompany.com/laser-inspection-machine/virtek-laserqc-afm-3d-laser-inspection-machine/.

"Laser scanning", Nikon, printed Sep. 17, 2019, © 2017 Nikon Metrology Inc., 2 pages. https://www.nikonmetrology.com/en-us/products/laser-scanning.

\* cited by examiner

LASER GRID INSPECTION OF THREE-DIMENSIONAL OBJECTS

BACKGROUND

Visual inspection systems may be automated to sort out defective objects. Some systems use surface detection or geometry estimation. Cameras may be used in such systems to perform visual inspections of objects. Some systems employ three-dimensional camera systems. Often light cast for surface detection, geometry estimation, or cameras is ambient lighting.

SUMMARY

According to an embodiment described herein, a computer-implemented method for optical inspection of three-dimensional objects is provided. The method projects an optical test line on a device under test. A frame is captured of the optical test line projected onto the device under test. The method provides a reference line for the device under test and compares the reference line and the optical test line within the frame. The method generates a visual quality determination based on the comparison of the reference line and the optical test line.

According to an embodiment described herein, a system for optical inspection of three-dimensional objects is provided. The system includes an optical line generator, one or more processors coupled to the optical line generator, and a computer-readable storage medium, coupled to the one or more processors, storing program instructions that, when executed by the one or more processors, cause the one or more processors to perform operations. The operations project an optical test line on a device under test. A frame is captured of the optical test line projected onto the device under test. The operations provide a reference line for the device under test and compare the reference line and the optical test line within the frame. The operations generate a visual quality determination based on the comparison of the reference line and the optical test line.

According to an embodiment described herein a computer program product for optical inspection of three-dimensional objects is provided. The computer program product includes a computer readable storage medium having program instructions embodied therewith, the program instructions being executable by one or more processors to cause the one or more processors to perform operations including projecting an optical test line on a device under test. A frame is captured of the optical test line projected onto the device under test. The computer program product provides a reference line for the device under test and compares the reference line and the optical test line within the frame. The computer program product generates a visual quality determination based on the comparison of the reference line and the optical test line.

DETAILED DESCRIPTION

The present disclosure relates generally to methods for visual inspection of objects. More particularly, but not exclusively, embodiments of the present disclosure relate to a computer-implemented method for optical inspection of three-dimensional objects using projected optical test lines. The present disclosure relates further to a related system for optical inspection of three-dimensional objects, and a computer program product for operating such a system.

Visual inspection systems may use cameras to estimate or determine qualities of an object. Some visual inspection systems cause delay, interrupting a stream of objects to perform automated quality inspections. Visual inspection systems are often calibrated or configured to inspect specified objects or specified parameters of those objects. Changes to objects or respective parameters often involve removal or changes of existing visual inspection systems, due to the calibrated nature of the camera systems used. The present disclosure enables faster visual inspection of objects using optical test patterns in combination with image sensors. Embodiments of the present disclosure enable use of a single visual inspection system across differing objects, object types, and object parameters. The present disclosure enables evaluation of parameters and qualities of three-dimensional objects or devices under test by projecting optical test patterns onto the three-dimensional objects and examining distortions of the optical test patterns captured within two-dimensional images.

Some embodiments of the concepts described herein may take the form of a system or a computer program product. For example, a computer program product may store program instructions that, when executed by one or more processors of a computing system, cause the computing system to perform operations described above with respect to the computer implemented method. By way of further example, the system may comprise components, such as processors and computer readable storage media. The computer readable storage media may interact with other components of the system to cause the system to execute program instructions comprising operations of the computer implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Figure 1:
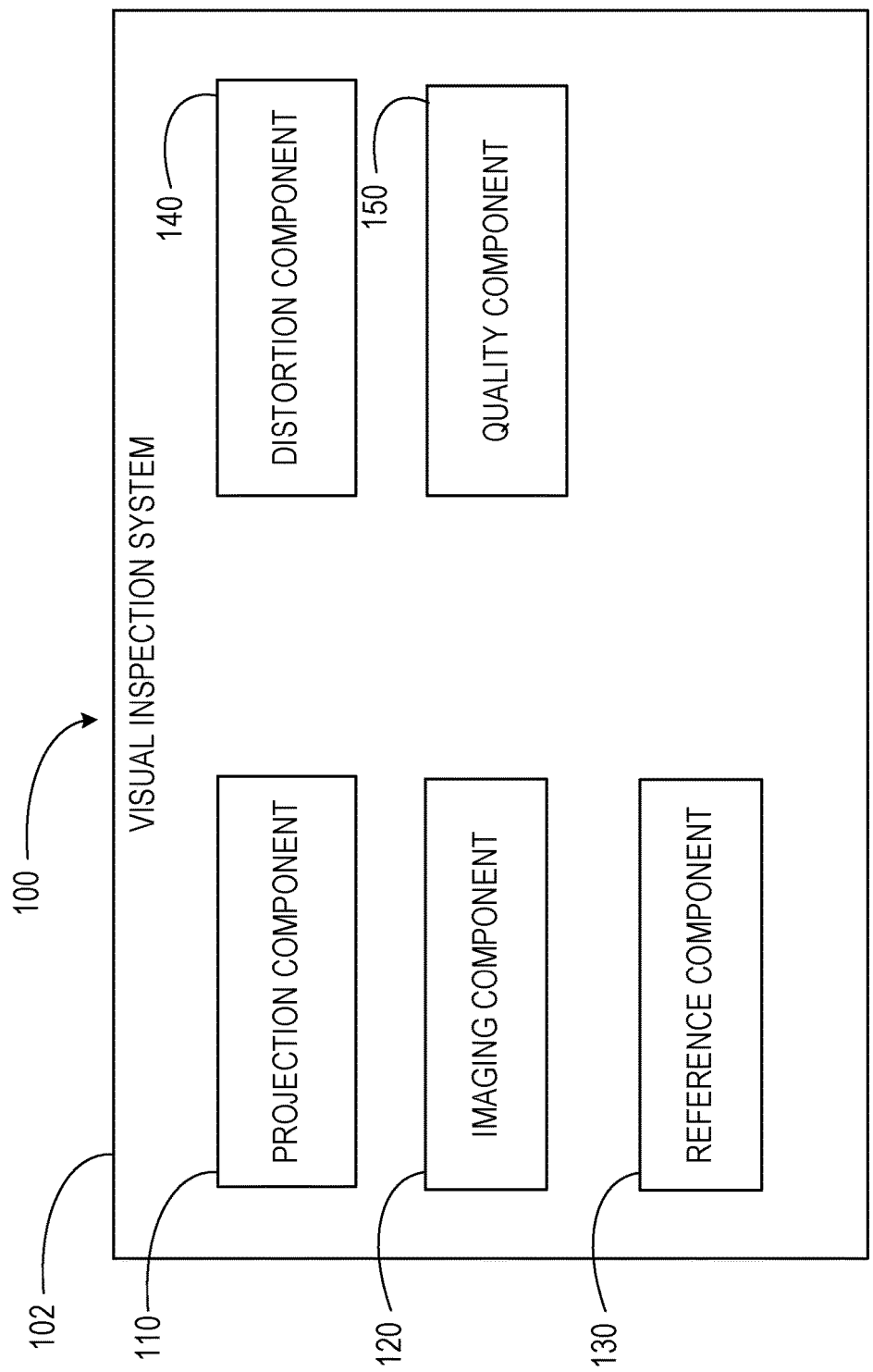
FIG. 1 depicts a block diagram of a computing environment for implementing concepts and computer-based methods, according to at least one embodiment.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a visual inspection system 102. The visual inspection system 102 may comprise a projection component 110, an imaging component 120, a reference component 130, a distortion component 140, and a quality component 150. The projection component 110 projects optical test lines and patterns on objects being optically inspected. The imaging component 120 captures frames of the optical test lines or patterns projected onto optically inspected objects. The reference component 130 provides reference lines or patterns for optically inspected objects. The distortion component 140 compares reference lines or patterns and projected optical test lines or patterns within a frame captured by the imaging component 120. The quality component 150 generates visual quality determinations for optically inspected objects. Although described with distinct components, it should be understood that, in at least some embodiments, components may be combined or divided, or additional components may be added, without departing from the scope of the present disclosure.

Figure 2:
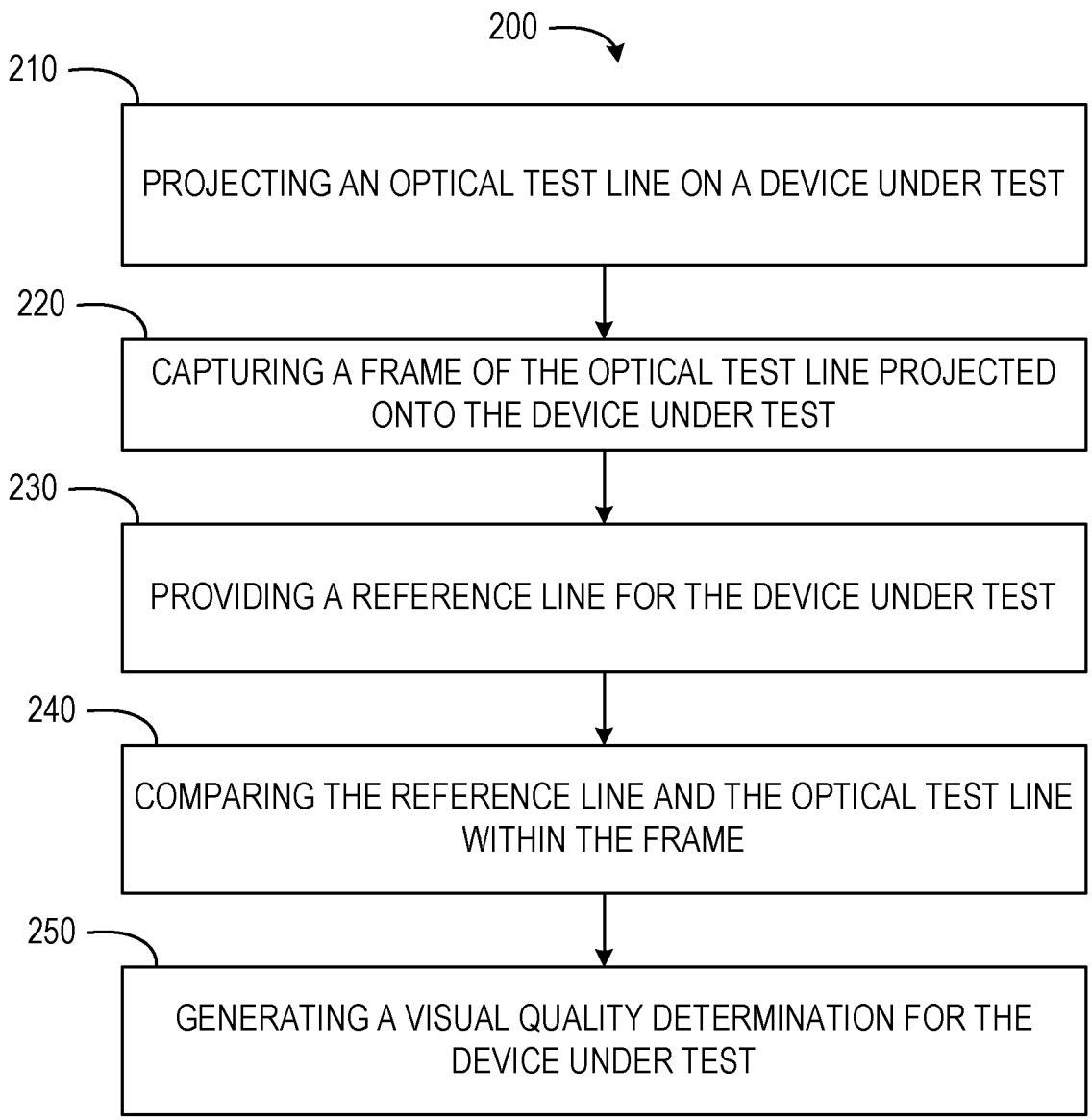
FIG. 2 depicts a flow diagram of a computer-implemented method for optical inspection of three-dimensional objects, according to at least one embodiment.

Referring now to FIG. 2, a flow diagram of a computer-implemented method 200 is shown. The computer-implemented method 200 is a method for optical inspection of three-dimensional objects. In some embodiments, the computer-implemented method 200 may be performed by one or more components of the computing environment 100, as described in more detail below.

At operation 210, the projection component 110 projects an optical test line on a device under test. The device under test may be understood as a three-dimensional object being presented for optical inspection. The device under test may be presented for optical inspection by being positioned within a field of view of an optical line generator and an image capture device. For example, the device under test may be positioned on a conveyor belt or other positioning device. The device under test may be moved by the positioning device into the field of view of the optical line generator and the image capture device. The optical line generator may be a laser emitter, a laser diode, a light emitting diode, an infrared light emitter, combinations thereof, or any other suitable optical emitter capable of projecting an optical test line or optical test pattern on the device under test.

In some embodiments, the optical test line is projected within a visual spectrum. An optical test line or pattern projected in the visual spectrum may be understood as a beam, line, or pattern of optical emission (e.g., light, laser, or wavelength) that is emitted or projected within a range of wavelengths perceivable by the human eye. For example, an optical test line, within the visual spectrum, may be a line or pattern of light emitted in one or more wavelengths in a range of 380 to 740 nanometers. In some embodiments, the optical test line is projected outside of a visual spectrum. An optical test line, outside of the visual spectrum, may be emitted in a wavelength outside of the 380 to 740 nanometers range. For example, an optical test line or pattern may be projected onto the device under test in a wavelength corresponding to ultraviolet or infrared light. Although described with reference to specified ranges of light wavelengths, it should be understood that the optical test line or pattern may be projected onto the device under test in any suitable wavelength, wavelength range, or combination of wavelengths capable of being identified or perceived by the image capture device.

Figure 7:
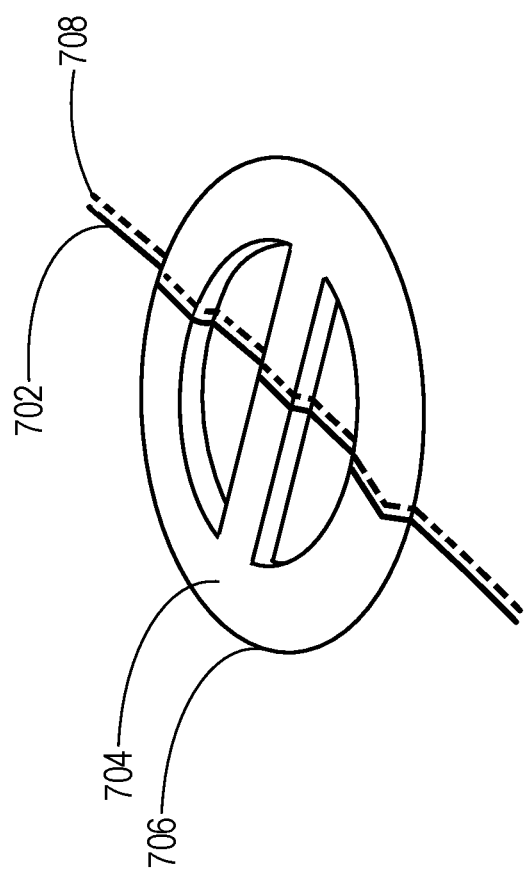
FIG. 7 depicts a captured frame of an optical test line and device under test with a superimposed reference line, according to at least one embodiment.
Figure 8:
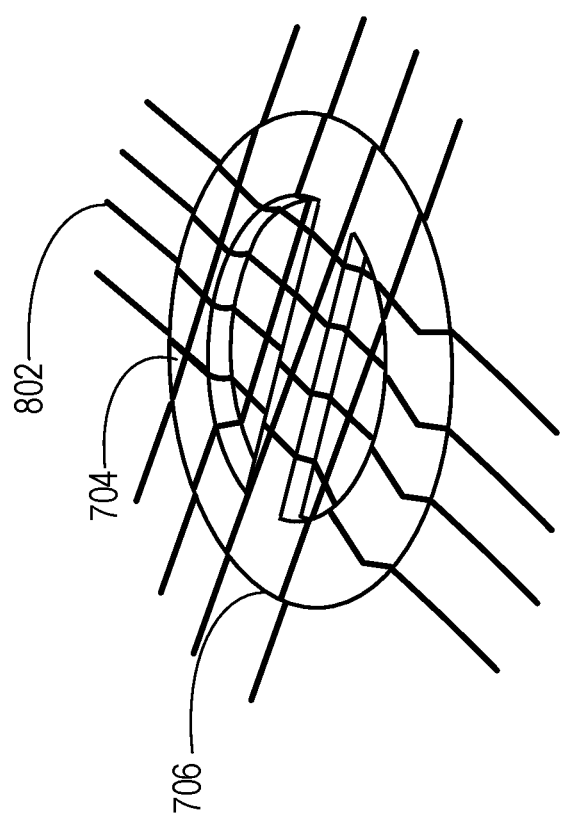
FIG. 8 depicts a device under test and a set of orthogonal crossing lines acting as an optical test line, according to at least one embodiment.
Figure 9:
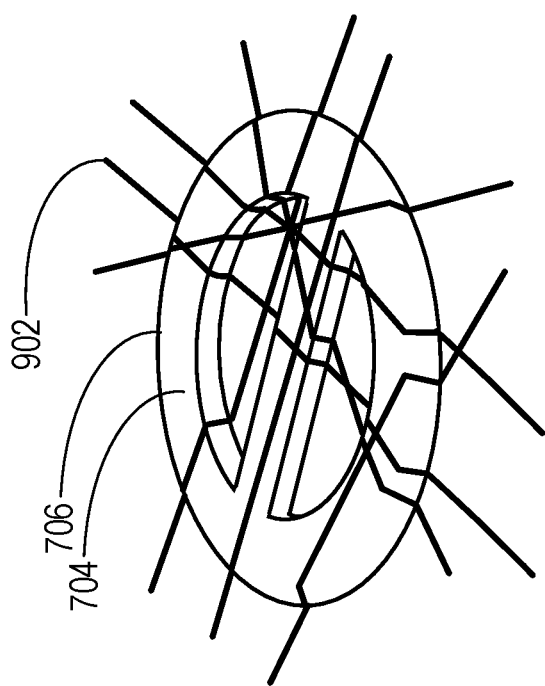
FIG. 9 depicts a device under test and a random set of intersecting lines acting as an optical test line, according to at least one embodiment.

In some embodiments, as shown in FIG. 7, the optical test line 702 is projected as a single line. The single line may be an unbroken line when projected onto a surface 704 within known parameters. The single line may also be associated with known parameters when projected onto a known or expected surface. For example, when projected onto a suitably manufactured device 706, the single line may be perceived as having an expected shape or set of parameters. In some embodiments, the optical test line is projected as a plurality of lines. The plurality of lines may form a pattern of test lines. The pattern of test lines may comprise a set of test lines, a set of parallel lines, an orthogonal matrix of crossing lines (e.g., orthogonal matrix of crossing lines 802 shown in FIG. 8), a random set of intersecting lines (e.g., random set of intersecting lines 902 shown in FIG. 9), combinations thereof, or any other suitable pattern of test lines. The pattern of test lines, when projected onto a device under test comporting to specified dimensions, may be perceived as having an expected shape or set of parameters.

At operation 220, the imaging component 120 captures a frame of the optical test line projected onto the device under test. As discussed in more detail below, the imaging component 120 may initially detect the device under test is positioned within a suitable field of view. The imaging component 120 may then determine that the optical test line is projected onto the device under test. The imaging component 120 may determine the optical test line is projected at a specified point on the device under test or within a range of positions on the device under test. Once the imaging component 120 determines the device under test is properly positioned and the optical test line is projected onto the device under test, the imaging component 120 captures the image or frame of the device under test and the optical test line. In some embodiments, the imaging component 120 passes the frame or image to one or more components of the visual inspection system 102 for further analysis.

The imaging component 120 may be or include a camera, an image sensor, a charge-coupled device (CCD), an active-pixel sensor, a metal-oxide semiconductor field-effect transistor (MOSFET), a complementary metal-oxide-semiconductor (CMOS), an IR sensitive image sensor, an ultraviolet sensitive image sensor, combinations thereof, or any other suitable imaging device. The image sensor of the imaging component 120 may be positioned proximate to the optical line generator. The positioning of the image sensor and the optical line generator may be known and oriented in a manner to provide image capture of an expected set of line metrics when an image or frame is captured of the optical test line being projected onto the device under test. The set of line metrics may be within specification or as expected where the device under test is properly formed and positioned under the projected optical test line, as discussed in more detail below.

In some embodiments, the imaging component 120 receives input indicating the device under test is positioned within a field of view of an image sensor and the optical test line is projected onto the device under test. The imaging component 120 may receive input from a position sensor indicating the device under test is positioned within the field of view of the image sensor. The imaging component 120 may receive input from the optical line generator indicating the optical test line is being projected. In such instances, the imaging component 120, receiving input from the position sensor and the optical line generator, may capture the image or frame of the device under test and the projected optical test line.

In some embodiments, the imaging component 120 performs one or more image recognition operations to determine that the device under test is positioned within the field of view of the image sensor and the optical test line is projected on the device under test. In such embodiments, the imaging component 120 identifies an object of interest entering the field of view of the image sensor. The imaging component 120 may identify the object of interest by performing object recognition, pattern recognition, edge detection, line detection, neural net processing, optical character recognition, combinations thereof, or any other suitable image recognition operations. The imaging component 120 may also perform image recognition operations to identify the optical test line projected onto the device under test. In some embodiments, the imaging component 120 uses the same or similar image recognition operations to identify the device under test and the optical test line. The imaging component 120 may identify the device under test and the optical test line using differing image recognition operations.

At operation 230, the reference component 130 provides a reference line for the device under test. To provide the reference line, the reference component 130 may select a reference line matching the optical test line. In such embodiments, the reference component 130 may receive an indicator for the optical test line being projected by the projection component 110. The reference component 130 may identify a reference line having an indicator matching the indicator of the optical test line. The reference component 130 may the provide the selected reference line.

As shown in FIG. 7, the reference component 130 may provide the reference line 708 by superimposing the reference line on the frame proximate to the optical test line 702 projected onto the device 706 under test within the frame. The reference line may overlap at least a portion of the optical test line. In some embodiments, the reference component 130 provides the reference line as a set of points of interest. The set of points of interest represent reference metrics for points or positions of expected refraction of the optical test line at specified portions of a properly formed device.

At operation 240, the distortion component 140 compares the reference line and the optical test line within the frame. The distortion component 140 may read optical or laser line distortions superimposed on a two-dimensional or three-dimensional topography of the device under test. The optical read of any distortions in the optical lines can be read from the frame of the optical test line superimposed on the device under test. The optical read may be performed by comparing laser line displacements between the optical test line and the reference line from the surface of the device under test. A defect in a surface, edge, or other aspect of the device under test may cause displacement or refraction of a portion of the optical test line from an expected position of the reference line.

In some embodiments, the distortion component 140 compares the reference line and the optical test line by identifying one or more points of distortion between the reference line and the optical test line within the frame. The distortion component 140 may identify pixel positions for the one or more points of refraction on the reference line and the optical test line. The distortion component 140 may identify the one or more points of distortion at one or more of the pixel positions corresponding to refractions, or lack thereof, on the reference line and the optical test line. The pixel positions may be identified as points of distortion occurring between the reference line and the optical test line. The one or more points of distortion may be points of the optical test line which are not overlapped by the reference line. In some instances, the points of distortion are identified as pixel positions corresponding to points of refraction occurring on the optical test line which have no corresponding refraction points on the reference line. In some instances, the points of distortion are identified as pixel positions corresponding to expected points of refraction on the reference line, which have no corresponding experimental or test points of refraction on the optical test line. Points of distortion may be associated with a distance separating an expected position with a test or actual position. Where a point of distortion is greater than a defect threshold (e.g., a distance between positions is greater than a distance threshold), the point of distortion represents a defect for the device under test. Where a point of distortion is less than a defect threshold, the point of distortion is determined to be within specifications of the device under test.

In some embodiments, the distortion component 140 compares the reference line and the optical test line by identifying test metrics for the device under test. The test metrics represent points on the optical test line refracting due to an impact on the device under test. In such embodiments, the distortion component 140 identifies points, positions, or pixels within the frame associated with the test metrics. The distortion component 140 compares the reference line and the optical test line by attempting to match the test metrics of refraction points of the optical test line with the reference metrics of refraction points of the reference line. Similar to the embodiment described above, where a position of a test metric and a corresponding reference metric are offset by a distance greater than a defect threshold, the position is determined to represent a point of distortion indicating a defect of the device under test.

At operation 250, the quality component 150 generates a visual quality determination for the device under test. The visual quality determination may be a pass/fail determination. The pass/fail determination may indicate that the device under test is of acceptable quality or unacceptable quality, respectively. The visual quality determination may be generated as an acceptance indicator, a light, or other indicator representing a device under test passing a visual quality inspection based on the optical test line and reference line. The visual quality determination may also be generated as a rejection indicator, a disposal operation, or other indicator representing a device under test failed a visual quality inspection based on the optical test line and reference line.

In some embodiments, the visual quality determination is based on the comparison of the reference line and the optical test line. The quality component 150 may aggregate the one or more points of distortion between the optical test line and the reference line. The quality component 150 may determine the device under test is within specifications where the one or more points of distortion are within a specification threshold. In some instances, the specification threshold represents a total amount of distance determined for points of distortion for the device under test to be out of specified parameters. The specification threshold may comprise a set of defect distances, with any one or more of the defect distances (e.g., distances between actual and expected refraction points) indicating the device under test is outside of acceptable specifications.

Figure 3:
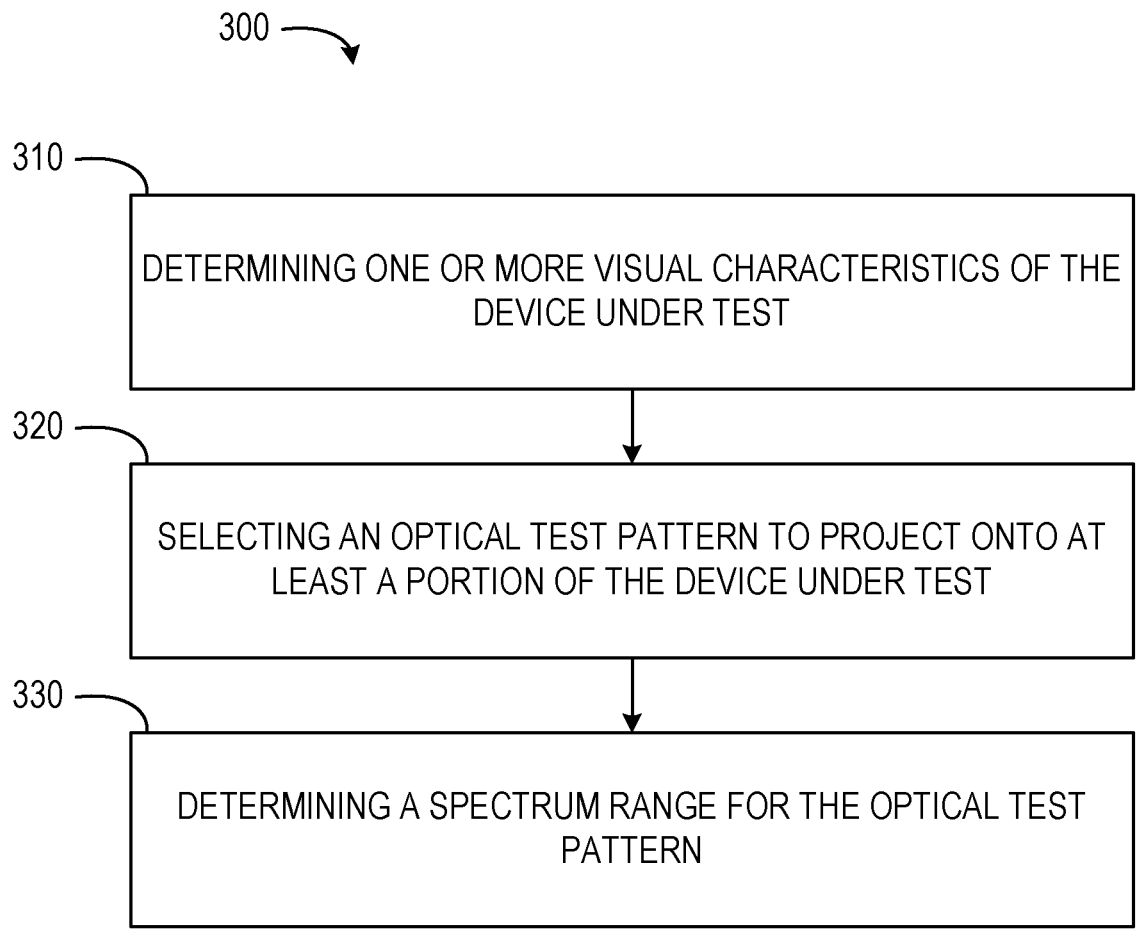
FIG. 3 depicts a flow diagram of a computer-implemented method for optical inspection of three-dimensional objects, according to at least one embodiment.

FIG. 3 shows a flow diagram of an embodiment of a computer-implemented method 300 for optical inspection of three-dimensional objects. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the imaging component 120 determines one or more visual characteristics of the device under test. The one or more visual characteristics may include one or more of a type of device, a position, an orientation, a shape, one or more edges of the device, one or more surfaces of the device, one or more colors, combinations thereof, and any other suitable visual characteristics. The imaging component 120 may determine the visual characteristics using object recognition, edge detection, optical character recognition, combinations thereof, or any other suitable image recognition or object modeling operations.

In operation 320, the projection component 110 selects an optical test pattern to project onto at least a portion of the device under test. The optical test pattern may be selected from a plurality of optical test patterns. The optical test patterns may include a line, a set of lines, a two-dimensional orthogonal matrix of crossing lines, a set of parallel lines, a random or chaotic grouping of lines, combinations thereof, or any other suitable pattern. In some embodiments, the optical test pattern is selected based on at least one visual characteristic of the device under test. The at least one visual characteristic identified from the one or more visual characteristics determined by the imaging component 120. In some embodiments, the projection component 110 selects the optical test pattern based on one or more of the type of device, the position, the orientation, the shape, an edge, and a surface of the device. The projection component 110 may select the optical test pattern as a pattern of optical test lines configured to visually identify one or more specified parameters of the device under test. For example, the projection component 110 may select a pattern of intersecting lines or a single line in a specified orientation, where a pattern of parallel lines may leave a gap proximate to a parameter (e.g., edge quality, edge straightness, or part intersection) to be visually inspected. By way of further example, the optical test pattern may be selected as a pattern having a least amount of distortion at intersection points on edges or surfaces of the device under test. In this way, distortion of the optical test pattern may be limited to a point, group of points, surface, or an edge being visually inspected.

In operation 330, the projection component 110 determines a spectrum range for the optical test pattern. In some embodiments, the spectrum range is determined based on the one or more visual characteristics of the device under test. The spectrum range may be within a visible wavelength or outside of a visible wavelength of light. The spectrum range may be determined based on a color of the device under test. For example, where a color of the device under test precludes visual inspection of the device under test using a first color or spectrum range, a second color or spectrum range may be selected. In some instances, the spectrum range is determined or selected based on reflection and refraction properties of a surface of the device under test. The spectrum may be selected as a spectrum having a threshold level of visibility or reflection for the surface of the device under test. In some embodiments, the spectrum range is selected based on the image sensor. The image sensor and the optical line generator may be aligned such that the spectrum range in which the optical test line is projected is a spectrum range perceivable or detectable by the image sensor.

Figure 4:
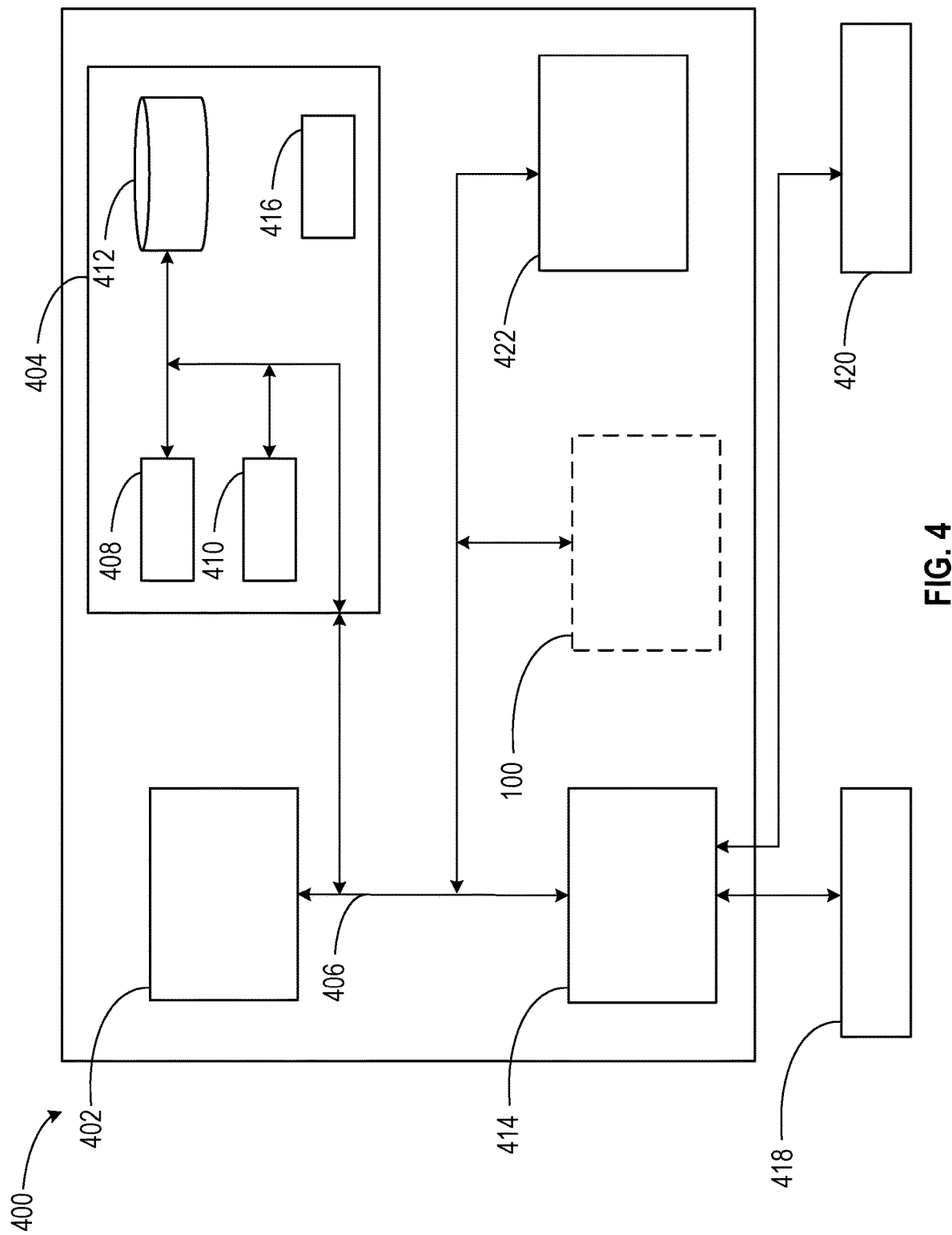
FIG. 4 depicts a block diagram of a computing system for optical inspection of three-dimensional objects, according to at least one embodiment.

Embodiments of the present disclosure may be implemented together with virtually any type of computer, regardless of the platform being suitable for storing and/or executing program code. FIG. 4 shows, as an example, a computing system 400 (e.g., cloud computing system) suitable for executing program code related to the methods disclosed herein and for optical inspection of three-dimensional objects.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the projection component 110, the imaging component 120, the reference component 130, the distortion component 140, and the quality component 150, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
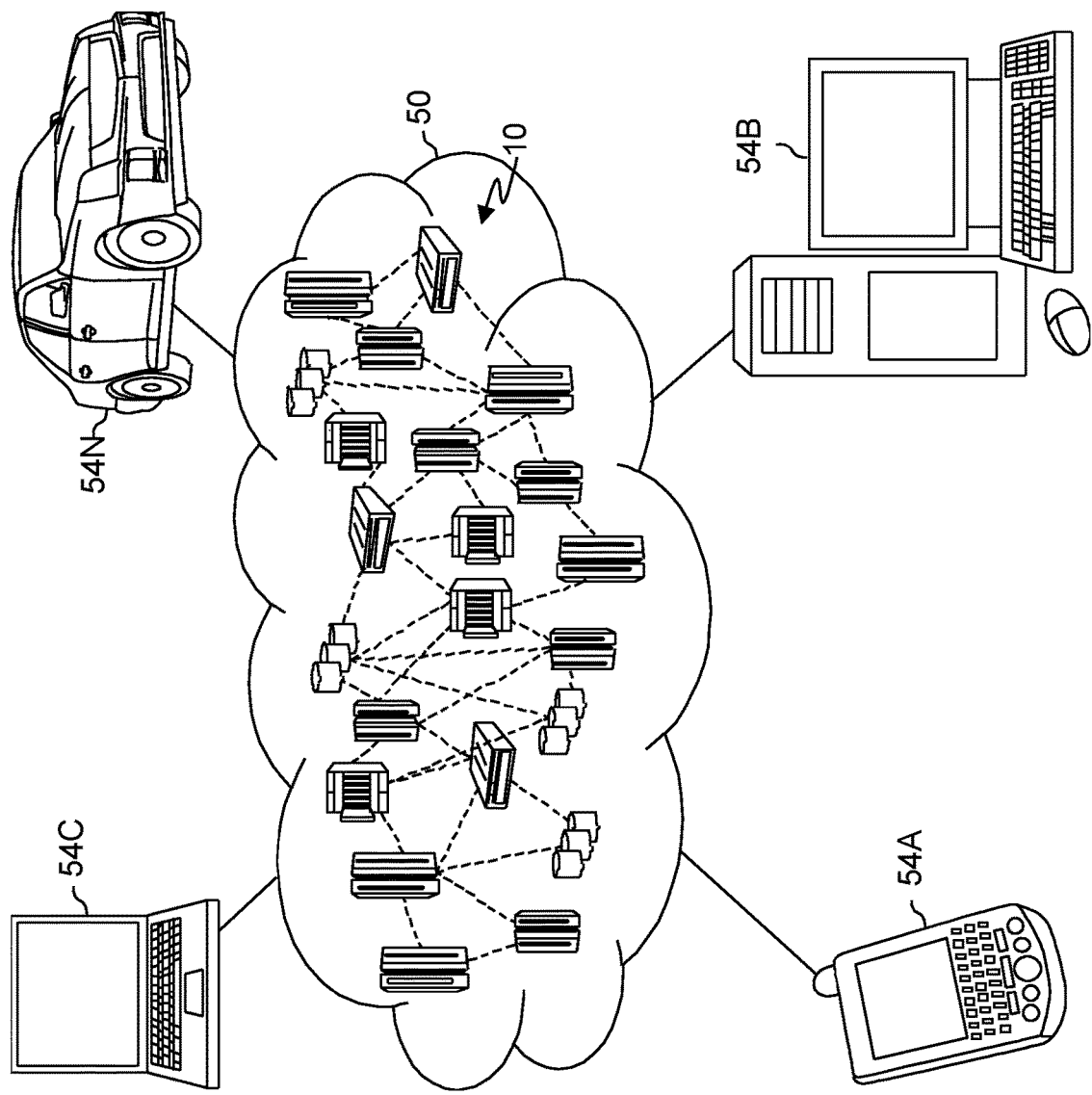
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
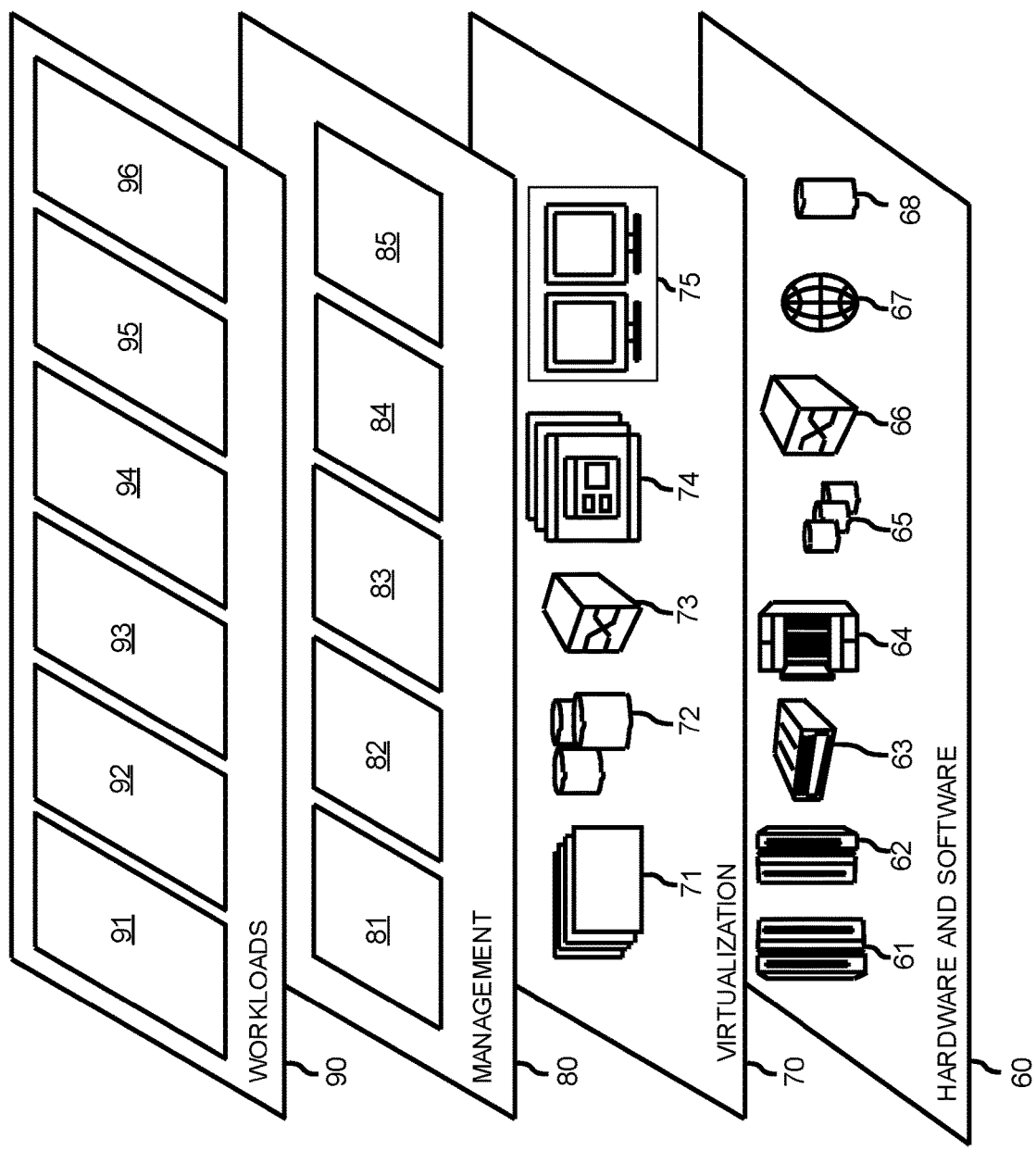
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network traffic direction processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, comprising:
projecting an optical test line on a device under test, the optical test line including points of refraction on the device under test;
capturing a frame of the optical test line projected onto the device under test;
providing a reference line for the device under test by superimposing the reference line onto the captured frame proximate to the optical test line and overlapping at least a portion of the optical test line, the reference line including expected points of refraction;
comparing the expected points of refraction included within the reference line and the points of refraction included within the optical test line within the frame; and
generating a visual quality determination based on the comparison of the expected points of refraction included within the reference line and the points of refraction included within the optical test line.

2. The method of claim 1, wherein the optical test line is projected within a visual spectrum.

3. The method of claim 1, wherein providing the reference line includes superimposing the reference line on the frame, and wherein comparing the reference line and the optical test line further comprises:
identifying points of distortion occurring between the reference line and the optical test line; and
determining a distance between the reference line and the optical test line at the points of distortion.

4. The method of claim 1, wherein the optical test line is projected as a pattern of test lines.

5. The method of claim 4, wherein the pattern of test lines is an orthogonal matrix of crossing lines.

6. The method of claim 4, wherein the pattern of test lines is a set of parallel lines.

7. The method of claim 4, wherein the pattern of test lines is a random set of intersecting lines.

8. A system, comprising:
an optical line generator;
one or more processors coupled to the optical line generator; and
a computer-readable storage medium, coupled to the one or more processors, storing program instructions that, when executed by the one or more processors, cause the one or more processors to perform operations comprising:
projecting an optical test line on a device under test, the optical test line including points of refraction on the device under test;
capturing a frame of the optical test line projected onto the device under test;
providing a reference line for the device under test by superimposing the reference line onto the captured frame proximate to the optical test line and overlapping at least a portion of the optical test line, the reference line including expected points of refraction;
comparing the expected points of refraction included within the reference line and the points of refraction included within the optical test line within the frame; and
generating a visual quality determination based on the comparison of the expected points of refraction included within the reference line and the points of refraction included within the optical test line.

9. The system of claim 8, wherein the optical test line is projected within a visual spectrum.

10. The system of claim 8, wherein providing the reference line includes superimposing the reference line on the frame, and wherein comparing the reference line and the optical test line further comprises:
identifying points of distortion occurring between the reference line and the optical test line; and
determining a distance between the reference line and the optical test line at the points of distortion.

11. The system of claim 8, wherein the optical test line is projected as a pattern of test lines, the pattern of test lines being an orthogonal matrix of crossing lines.

12. The system of claim 8, wherein the optical test line is projected as a pattern of test lines, the pattern of test lines being a set of parallel lines.

13. The system of claim 8, wherein the optical test line is projected as a pattern of test lines, the pattern of test lines being a random set of intersecting lines.

14. A computer program product comprising a computer readable storage medium having program instructions embodied therewith, the program instructions being executable by one or more processors to cause the one or more processors to perform operations comprising:
projecting an optical test line on a device under test, the optical test line including points of refraction on the device under test;
capturing a frame of the optical test line projected onto the device under test;
providing a reference line for the device under test by superimposing the reference line onto the captured frame proximate to the optical test line and overlapping at least a portion of the optical test line, the reference line including expected points of refraction;
comparing the expected points of refraction included within the reference line and the points of refraction included within the optical test line within the frame; and
generating a visual quality determination based on the comparison of the expected points of refraction included within the reference line and the points of refraction included within the optical test line.

15. The computer program product of claim 14, wherein the optical test line is projected within a visual spectrum.

16. The computer program product of claim 14, wherein providing the reference line includes superimposing the reference line on the frame, and wherein comparing the reference line and the optical test line further comprises:
identifying points of distortion occurring between the reference line and the optical test line; and
determining a distance between the reference line and the optical test line at the points of distortion.

17. The computer program product of claim 14, wherein the optical test line is projected as a pattern of test lines.

18. The computer program product of claim 17, wherein the pattern of test lines is an orthogonal matrix of crossing lines.

19. The computer program product of claim 17, wherein the pattern of test lines is a set of parallel lines.

20. The computer program product of claim 17, wherein the pattern of test lines is a random set of intersecting lines.

* * * * *